(12) United States Patent
Lee

(10) Patent No.: US 9,095,167 B2
(45) Date of Patent: Aug. 4, 2015

(54) SUPERCOOLING SYSTEM FOR SUPERCOOLING A STORED LIQUID

(75) Inventor: Hoon-Bong Lee, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 1122 days.

(21) Appl. No.: 13/128,354

(22) PCT Filed: Jan. 6, 2010

(86) PCT No.: PCT/KR2010/000060
§ 371 (c)(1),
(2), (4) Date: May 9, 2011

(87) PCT Pub. No.: WO2010/079945
PCT Pub. Date: Jul. 15, 2010

(65) Prior Publication Data
US 2011/0219800 A1 Sep. 15, 2011

(30) Foreign Application Priority Data
Jan. 8, 2009 (KR) ........................ 10-2009-0001669

(51) Int. Cl.
*F25D 17/06* (2006.01)
*A23L 3/36* (2006.01)
*A23L 3/26* (2006.01)
*A23L 3/32* (2006.01)
*F25C 1/00* (2006.01)
*F25D 29/00* (2006.01)
*F25D 31/00* (2006.01)
*F25D 11/02* (2006.01)

(52) U.S. Cl.
CPC ... *A23L 3/36* (2013.01); *A23L 3/26* (2013.01); *A23L 3/32* (2013.01); *F25C 1/00* (2013.01); *F25D 29/00* (2013.01); *F25C 2600/04* (2013.01); *F25D 11/02* (2013.01); *F25D 17/065* (2013.01); *F25D 31/002* (2013.01); *F25D 2317/061* (2013.01); *F25D 2700/12* (2013.01); *F25D 2700/16* (2013.01)

(58) Field of Classification Search
CPC ....... F25D 11/02; F25D 17/06; F25D 17/065; F25D 31/002; F25D 2317/06; F25D 2317/061; F25D 2700/12; F25D 2700/121
USPC .............. 62/62, 132, 186, 407, 419, 440, 441
See application file for complete search history.

(56) References Cited

U.S. PATENT DOCUMENTS

| | | | |
|---|---|---|---|
| 7,621,139 B2 * | 11/2009 | Ha et al. .......................... | 62/135 |
| 2008/0241338 A1 | 10/2008 | Pfister | |
| 2008/0245079 A1 * | 10/2008 | Lim et al. .......................... | 62/66 |
| 2009/0254220 A1 * | 10/2009 | Shin et al. ...................... | 700/275 |

FOREIGN PATENT DOCUMENTS

| | | |
|---|---|---|
| JP | 2007-271153 A | 10/2007 |
| WO | WO 2008/150103 A2 | 12/2008 |
| WO | WO 2008/150106 A2 | 12/2008 |

* cited by examiner

*Primary Examiner* — Jonathan Bradford
(74) *Attorney, Agent, or Firm* — Birch, Stewart, Kolasch & Birch, LLP

(57) ABSTRACT

A supercooling system includes a cooling apparatus and a supercooling apparatus. The cooling apparatus includes a storing unit storing an object, a cooling unit, and a main control unit controlling the cooling unit to maintain the temperature in the storing unit at a temperature below the maximum ice crystal formation zone of the liquid. The supercooling apparatus includes an independent storage room having a storing space, a temperature sensing unit sensing the temperature of the independent storage room, a temperature control unit mounted in the independent storage room and controlling the internal temperature and a sub-control unit controlling the temperature control unit based on the sensed temperature from the temperature sensing unit to store the liquid in a supercooled state.

22 Claims, 8 Drawing Sheets

SUPERCOOLING SYSTEM FOR SUPERCOOLING A STORED LIQUID

TECHNICAL FIELD

The present invention relates to a supercooling system, and, more particularly, to a supercooling system which can independently supercool a stored liquid object cooled in a cooling space.

BACKGROUND ART

Supercooling means the phenomenon that a molten object or a solid is not changed although it is cooled to a temperature below the phase transition temperature in an equilibrium state. A material has a stable state at every temperature. If the temperature is slowly changed, the constituent elements of the material can follow the temperature changes, maintaining the stable state at each temperature. However, if the temperature is suddenly changed, since the constituent elements cannot be changed to the stable state at each temperature, the constituent elements maintain a stable state of the initial temperature, or some of the constituent elements fail to be changed to a state of the final temperature.

For example, when water is slowly cooled, it is not temporarily frozen at a temperature below 0° C. However, when water enters a supercooled state, it has a kind of quasi-stable state. As this unstable equilibrium state is easily broken even by slight stimulation, water tends to move to a more stable state. That is, if a small piece of material is put into the supercooled liquid, or if the liquid is suddenly shaken, the liquid starts to be frozen at once such that its temperature reaches the freezing point, and maintains a stable equilibrium state at this temperature.

In general, an electrostatic atmosphere is made in a refrigerator and meat and fish are thawed in the refrigerator at a minus temperature. In addition to the meat and fish, fruit is kept fresh in the refrigerator.

This technology uses a supercooling phenomenon. The supercooling phenomenon indicates the phenomenon that a molten object or a solid is not changed although it is cooled to a temperature below the phase transition temperature in an equilibrium state.

This technology includes Korean Patent Publication No. 2000-0011081 titled "Electrostatic field processing method, electrostatic field processing apparatus, and electrodes therefor".

FIG. 1 is a view of an example of a conventional thawing and freshness-keeping apparatus. A keeping-cool room 1 is composed of a thermal insulator 2 and an outer wall 5. A mechanism (not shown) controlling a temperature inside the room 1 is installed therein. A metal shelf 7 installed in the room 1 has a two-layer structure. Target objects to be thawed or freshness-kept and ripened such as vegetables, meat and marine products are loaded on the respective layers. The metal shelf 7 is insulated from the bottom of the room 1 by an insulator 9. In addition, since a high voltage generator 3 can generate 0 to 5000 V of DC and AC voltages, an insulation plate 2a such as vinyl chloride, etc. is covered on the inside of the thermal insulator 2. A high-voltage cable 4 outputting the voltage of the high voltage generator 3 is connected to the metal shelf 7 after passing through the outer wall 5 and the thermal insulator 2.

When a user opens a door installed at the front of the keeping-cool room 1, a safety switch 13 (see FIG. 2) is turned off to intercept the output of the high voltage generator 3.

FIG. 2 is a circuit configuration view of the high voltage generator 3. 100 V of AC is supplied to a primary side of a voltage regulation transformer 15. Reference numeral 11 represents a power lamp and 19 a working state lamp. When the door 6 is closed and the safety switch 13 is on, a relay 14 is operated. This state is displayed by a relay operation lamp 12. Relay contact points 14a, 14b and 14c are closed by the operation of the relay 14, and 100 V of AC is applied to the primary side of the voltage regulation transformer 15.

The applied voltage is regulated by a regulation knob 15a on a secondary side of the voltage regulation transformer 15, and the regulated voltage value is displayed on a voltmeter. The regulation knob 15a is connected to a primary side of a boosting transformer 17 on the secondary side of the voltage regulation transformer 15. The boosting transformer 17 boosts the voltage at a ratio of 1:50. For example, when 60 V of voltage is applied, it is boosted to 3000 V.

One end $O_1$ of the output of the secondary side of the boosting transformer 17 is connected to the metal shelf 7 insulated from the keeping-cool room 1 through the high-voltage cable 4, and the other end $O_2$ of the output is grounded. Moreover, since the outer wall 5 is grounded, if the user touches the outer wall 5 of the keeping-cool room 1, he/she does not get an electric shock. Further, in FIG. 1, when the metal shelf 7 is exposed in the room 1, it should be maintained in an insulated state in the room 1. Thus, the metal shelf 7 needs to be separated from the wall of the room 1 (the air performs an insulation function). Furthermore, if a target object 8 is protruded from the metal shelf 7 and brought into contact with the wall of the room 1, the current flows to the ground through the wall of the room 1. Therefore, the insulation plate 2a is attached to the inner wall to prevent drop of the applied voltage. Still furthermore, when the metal shelf 7 is covered with vinyl chloride without being exposed in the room 1, an electric field atmosphere is produced in the entire room 1.

In the prior art, an electric field or a magnetic field is applied to the stored object to be cooled, such that the stored object enters a supercooled state. Accordingly, a complicated apparatus for producing the electric field or the magnetic field should be provided to keep the stored object in the supercooled state, and the power consumption is increased during the production of the electric field or the magnetic field. Additionally, the apparatus for producing the electric field or the magnetic field should further include a safety device (e.g., an electric or magnetic field shielding structure, an interception device, etc.) for protecting the user from high power, when producing or intercepting the electric field or the magnetic field.

DISCLOSURE

Technical Problem

An object of the present invention is to provide a supercooling system and a supercooling apparatus which can reliably prevent the formation of ice crystal nucleuses in a stored object of a supercooled state.

Another object of the present invention is to provide a supercooling system and a supercooling apparatus which can prevent the formation of ice crystal nucleuses and easily adjust a supercooling temperature of a stored object.

A further object of the present invention is to provide a supercooling system and a supercooling apparatus which can maintain a stored object in a supercooled state only by the power supply in a space where only the cooling is performed.

A still further object of the present invention is to provide a supercooling system and a supercooling apparatus which can maintain a desired supercooled state by preventing the heat exchange between an upper portion and a lower portion of a storing space.

A still further object of the present invention is to provide a supercooling system and a supercooling apparatus which can supply or generate heat according to the temperature of an upper portion and a lower portion of a storing space.

A still further object of the present invention is to provide a supercooling system and a supercooling apparatus which can circulate the air in a storing space by forcible convection.

A still further object of the present invention is to provide a supercooling apparatus which can be easily installed in a cooling space and independently maintain a stored liquid in a supercooled state.

A still further object of the present invention is to provide a supercooling apparatus which can independently determine a supercooled state of a stored object and maintain the stored object in the supercooled state or frozen state.

Technical Solution

According to an aspect of the present invention, there is provided a supercooling system, including: a cooling apparatus including a storing unit storing a stored object, a cooling means cooling the storing unit, and a main control unit storing external commercial power and controlling the cooling means to maintain the temperature in the storing unit at a temperature below the maximum ice crystal formation zone of a liquid; and a supercooling apparatus including an independent storage room having a storing space therein to receive a storing container containing a liquid to be supercooled, and being mounted and cooled in the storing unit, a temperature sensing unit sensing the temperature of the independent storage room, a temperature control means mounted in the independent storage room and controlling the internal temperature such that a temperature of an upper portion of the storing space or the storing container is higher than a temperature of a lower portion of the storing space or the storing container, and a sub-control unit controlling the temperature control means based on the sensed temperature from the temperature sensing unit to store the liquid in a supercooled state. In addition, preferably, a boundary film is provided to limit the air and heat exchange between the upper and lower portions of the storing space, and at least a part of the storing container passes through the boundary film, so that the storing container is located in the upper and lower portions of the storing space.

Moreover, preferably, the supercooling apparatus includes a fan element circulating the air in the lower portion of the storing space by forcible convection.

Further, preferably, the supercooling apparatus is operated by the operating power applied from the main control unit, and the sub-control unit independently performs the supercooled-state control on the liquid with respect to the main control unit.

Furthermore, preferably, the supercooling apparatus includes an input unit capable of acquiring a supercooling control input and a cooling control input in relation to the stored object and a display unit capable of displaying the state of the current control, and the sub-control unit controls the input unit and the display unit.

Still furthermore, preferably, the temperature control means includes a heat source supply unit supplying or generating heat in the independent storage room.

Still furthermore, preferably, the heat source supply unit includes an upper heat source supply unit installed in the upper portion of the storing space and a lower heat source supply unit installed in the lower portion of the storing space.

Still furthermore, preferably, the temperature sensing unit is installed in at least one of the upper and lower portions of the storing space.

Still furthermore, preferably, the sub-control unit independently controls the upper and lower heat source supply units based on the temperature of a temperature sensor installed in the same space of the storing space.

Still furthermore, preferably, the supercooling apparatus includes a plurality of independent storage rooms separated from one another, and the sub-control unit independently controls each independent storage room, or a plurality of independent sub-control units are provided in the independent storage rooms, respectively.

Still furthermore, preferably, the heat source supply unit includes thermoelectric elements mounted in the upper and lower portions of the storing space, respectively.

Still furthermore, preferably, the cooling apparatus includes a storing unit door opening and closing the storing unit, and the supercooling system includes a first sensing unit sensing the opening and closing of the storing unit door.

Still furthermore, preferably, the cooling apparatus includes a display device displaying the operation state and temperature information of the supercooling system, and the first sensing unit is connected to the display device or the main control unit and the sub-control unit acquires the opening and closing information of the storing unit door from the display device or the main control unit, or the first sensing unit is connected directly to the sub-control unit.

Still furthermore, preferably, the sub-control unit stops the driving of the fan element and activates the display unit, when the storing unit door is opened.

Still furthermore, preferably, the supercooling apparatus includes a storing space door opening and closing the storing space and a second sensing unit sensing the opening and closing of the storing space door.

Still furthermore, preferably, the second sensing unit senses a temperature change in the storing space and determines the opening and closing of the storing space door.

Still furthermore, preferably, the sub-control unit is connected to the second sensing unit, and stops the driving of the fan element and activates the display unit, when the storing space door is opened.

Still furthermore, preferably, the temperature sensing unit is located corresponding to the bottom surface of the storing container.

Still furthermore, preferably, the supercooling apparatus includes a position guide portion guiding the center of the bottom surface of the storing container to be located on the temperature sensing unit.

Still furthermore, preferably, the supercooling apparatus includes a storage sensing unit determining whether the storing container has been located in the storing space, and the sub-control unit performs the supercooled-state control in cooperation with the sensing result of the storage sensing unit.

Still furthermore, preferably, the storage sensing unit is operated by the weight of the storing container.

Still furthermore, preferably, the storage sensing unit includes a light-emitting portion formed in the storing space and a light-receiving portion corresponding to the light-emitting portion, and senses the storage of the storing container by the operation of the light-emitting portion and the light-receiving portion.

Advantageous Effects

An embodiment of the present invention can stably store a stored object in a supercooled state for an extended period of time by reliably preventing the formation of ice crystal nucleuses in the stored object of the supercooled state.

An embodiment of the present invention can maintain a stored object at a desired supercooled state temperature by preventing the formation of ice crystal nucleuses and easily adjusting the supercooling temperature of the stored object.

An embodiment of the present invention can achieve a simple structure and independent supercooling control by maintaining a stored object in a supercooled state only by the power supply in a space where only the cooling is performed.

An embodiment of the present invention can reliably maintain a desired supercooled state by preventing the heat exchange between an upper portion and a lower portion of a storing space.

An embodiment of the present invention can accurately maintain the temperature of a stored object by supplying or generating heat according to the temperature of an upper portion and a lower portion of a storing space.

An embodiment of the present invention can uniformly maintain the temperature of a stored object by circulating the air in a storing space by forcible convection.

An embodiment of the present invention can easily install a supercooling apparatus in a cooling space and enable the supercooling apparatus to independently maintain a stored liquid in a supercooled state.

An embodiment of the present invention can enable a supercooling apparatus to independently determine a supercooled state of a stored object and maintain the stored object in the supercooled state or frozen state.

MODE FOR INVENTION

Hereinafter, the present invention will be described in detail with reference to the exemplary embodiments and the accompanying drawings.

Figure 1:
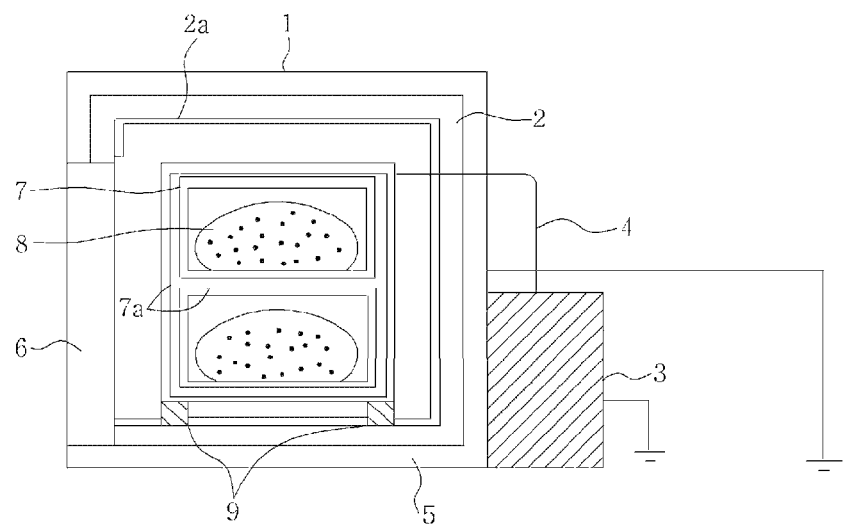
FIG. 1 is a view of an example of a conventional thawing and freshness-keeping apparatus.
Figure 2:
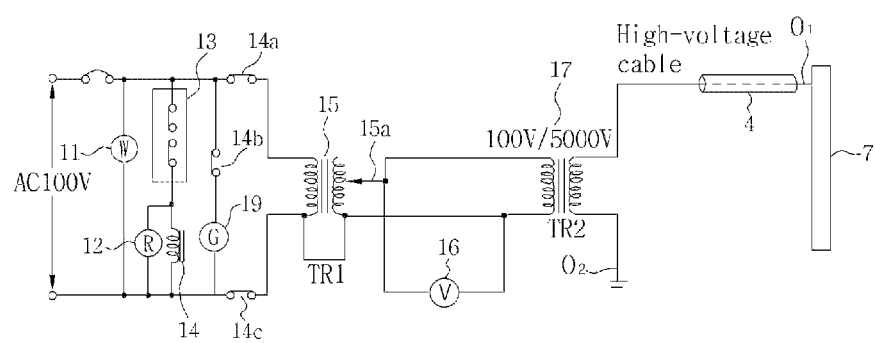
FIG. 2 is a circuit configuration view of a high voltage generator.
Figure 3:
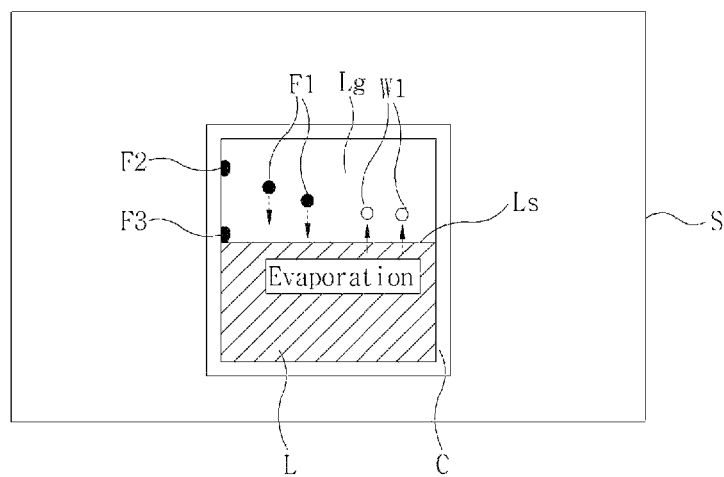
FIG. 3 is a view showing a process in which ice crystal nucleuses are formed in a liquid during the cooling.

FIG. 3 is a view showing a process in which ice crystal nucleuses are formed in a liquid during the cooling. As illustrated in FIG. 3, a container C containing a liquid L (or a stored object) is cooled in a storing unit S with a cooling space therein.

For example, it is assumed that a cooling temperature of the cooling space is lowered from a room temperature to a temperature below 0° C. (the phase transition temperature of water) or a temperature below the phase transition temperature of the liquid L. While the cooling is carried out, it is intended to maintain a supercooled state of the water or the liquid L (or the stored object) at a temperature below the maximum ice crystal formation zone (−1° C. to −7° C.) of the water in which the formation of ice crystals is maximized, or at a cooling temperature below the maximum ice crystal formation zone of the liquid L.

The liquid L is evaporated during the cooling such that vapor W1 is introduced into a gas Lg (or a space) in the container C. In a case where the container C is closed, the gas Lg may be supersaturated due to the evaporated vapor W1.

When the cooling temperature reaches or exceeds a temperature of the maximum ice crystal formation zone of the liquid L, the vapor W1 forms ice crystal nucleuses F1 in the gas Lg or ice crystal nucleuses F2 on an inner wall of the container C. Alternatively, the condensation occurs in a contact portion of the surface Ls of the liquid L and the inner wall of the container C (almost the same as the cooling temperature of the cooling space) such that the condensed liquid L may form ice crystal nucleuses F3 which are ice crystals.

For example, when the ice crystal nucleuses F1 in the gas Lg are lowered and infiltrated into the liquid L through the surface Ls of the liquid L, the liquid L is released from the supercooled state and caused to be frozen. That is, the supercooling of the liquid L is released.

Alternatively, as the ice crystal nucleuses F3 are brought into contact with the surface Ls of the liquid L, the liquid L is released from the supercooled state and caused to be frozen.

As described above, according to the process of forming the ice crystal nucleuses F1 to F3, when the liquid L is stored at a temperature below its maximum ice crystal formation zone, the liquid L is released from the supercooled state due to the freezing of the vapor evaporated from the liquid L and existing on the surface Ls of the liquid L and the freezing of the vapor on the inner wall of the container C adjacent to the surface Ls of the liquid L.

Figure 4:
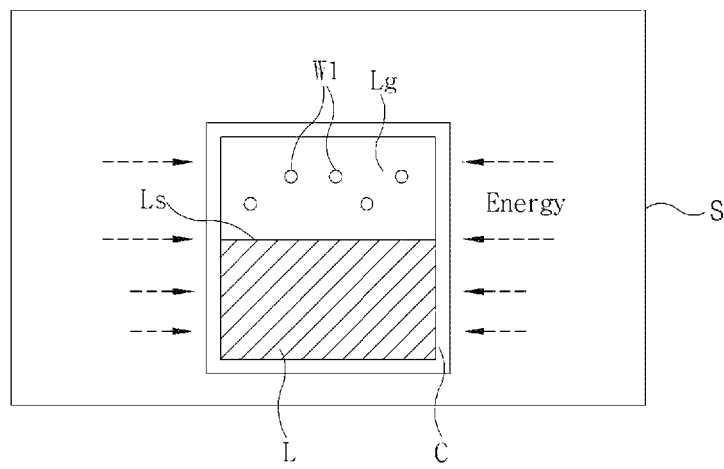
FIG. 4 is a view showing a process of preventing the ice crystal nucleus formation, which is applied to a supercooling apparatus according to the present invention.

FIG. 4 is a view showing a process of preventing the ice crystal nucleus formation, which is applied to a supercooling apparatus according to the present invention.

In FIG. 4, to prevent the freezing of the vapor W1 in the gas Lg, i.e., to continuously maintain the vapor W1 state, energy is applied to at least the gas Lg or the surface Ls of the liquid L so that the temperature of the gas Lg or the surface Ls of the liquid L can be higher than a temperature of the maximum ice crystal formation zone of the liquid L, more preferably, the phase transition temperature of the liquid L. In addition, to prevent the freezing although the surface Ls of the liquid L is brought into contact with the inner wall of the container C, the temperature of the surface Ls of the liquid L is maintained higher than a temperature of the maximum ice crystal formation zone of the liquid L, more preferably, the phase transition temperature of the liquid L.

Accordingly, the liquid L in the container C maintains the supercooled state at a temperature below its phase transition temperature or a temperature below its maximum ice crystal formation zone.

Moreover, when the cooling temperature in the storing unit S is a considerably low temperature, e.g., −20° C., although energy is applied to an upper portion of the container C, the liquid L which is the stored object may not be able to maintain the supercooled state. There is a need that energy should be applied to a lower portion of the container C to some extent. When the energy applied to the upper portion of the container C is relatively larger than the energy applied to the lower portion of the container C, the temperature of the upper portion of the container C can be maintained higher than the phase transition temperature or a temperature of the maximum ice crystal formation zone. Further, the temperature of the liquid L in the supercooled state can be adjusted by the energy applied to the lower portion of the container C and the energy applied to the upper portion of the container C.

The liquid L has been described as an example with reference to FIGS. 3 and 4. In the case of a stored object containing a liquid, when the liquid in the stored object is continuously supercooled, the stored object can be kept fresh for an extended period of time. The stored object can be maintained in a supercooled state at a temperature below the phase transition temperature via the above process. Here, the stored object may include meat, vegetable, fruit and other food as well as the liquid.

Furthermore, the energy used in the present invention may be thermal energy, electric or magnetic energy, ultrasonic-wave energy, light energy, and so on.

Figure 5:
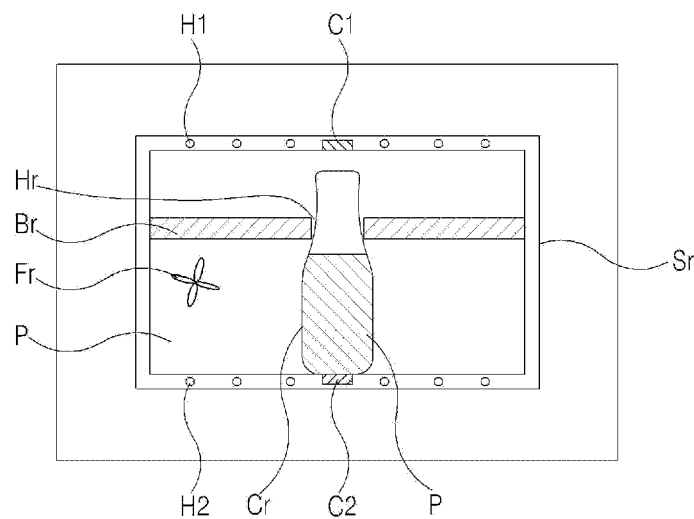
FIG. 5 is a schematic configuration view of the supercooling apparatus according to the present invention.

FIG. 5 is a schematic configuration view of the supercooling apparatus according to the present invention.

The supercooling apparatus of FIG. 5 includes a case Sr mounted in the storing unit S in which the cooling is performed and having a storing space therein, a heat generation coil H1 mounted on the inside of the top surface of the case Sr and generating heat, a temperature sensor C1 sensing a temperature of an upper portion of the storing space, a heat generation coil H2 mounted on the inside of the bottom surface of the case Sr and generating heat, and a temperature sensor C2 sensing a temperature of a lower portion of the storing space or a temperature of a stored object P.

The supercooling apparatus is installed in the storing unit S. While the cooling is performed, the temperature sensors C1 and C2 sense the temperature and the heat generation coils H1 and H2 are turned on to supply heat from the upper and lower portions of the storing space to the storing space. The heat supply quantity is adjusted to control the temperature of the upper portion of the storing space (or the air on the stored object P) to be higher than a temperature of the maximum ice crystal formation zone, more preferably, the phase transition temperature.

Particularly, a boundary film Br is formed in the case Sr to separate the upper and lower portions of the storing space and prevent the heat exchange between the upper and lower portions thereof. The boundary film Br includes a hole Hr through which a top end portion of a container Cr containing a liquid P is located in the upper portion of the storing space. The portion of the boundary film Br around the hole Hr is made of an elastic material to minimize the air flow, particularly, the heat flow between the upper and lower portions of the storing space. The upper portion of the container Cr passes through the hole Hr of the boundary film Br and is located in the upper portion of the storing space, and the lower portion of the container Cr is located in the lower portion of the storing space. The boundary film Br makes it easy to maintain the upper and lower portions of the storing space or the upper and lower portions of the container Cr at a desired temperature. The temperature sensor C2 is disposed on the bottom surface of the container Cr to accurately sense the temperature of the container Cr or the liquid which is the stored object P.

In addition, a fan element Fr is provided in the lower storing space of the case Sr to circulate the air and heat in the lower portion by forcible convection. Accordingly, the heat supplied by the heat generation coil H2 can be uniformly transferred to the lower storing space and the stored object.

The positions of the heat generation coils H1 and H2 in FIG. 5 are appropriately determined to supply the heat (or energy) to the stored object P and the storing space. The heat generation coils H1 and H2 may be inserted into the side surfaces of the case Sr.

Figure 6:
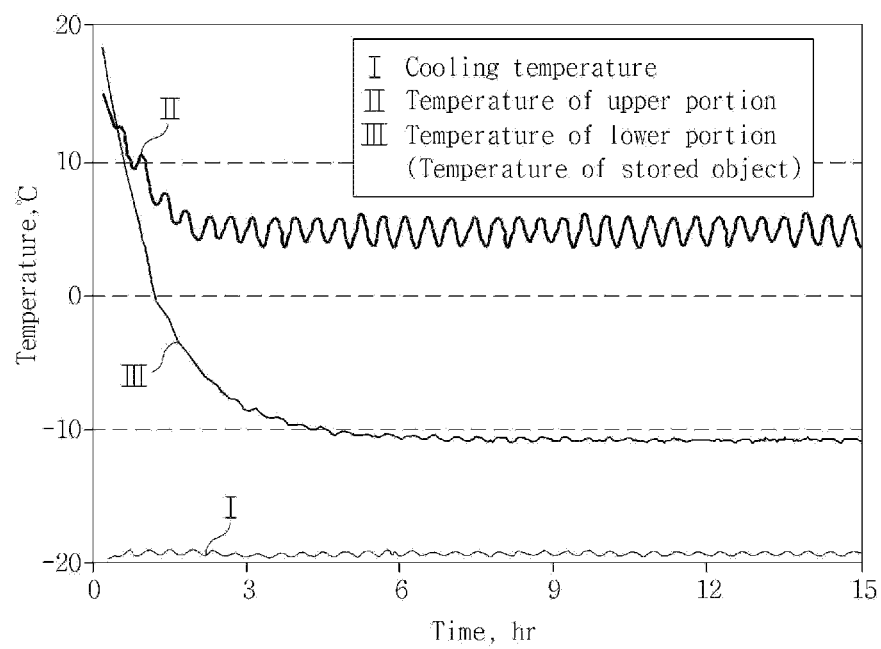
FIG. 6 is a graph showing a supercooled state of water in the supercooling apparatus of FIG. 5.

FIG. 6 is a graph showing the supercooled state of water in the supercooling apparatus of FIG. 5. The graph of FIG. 6 is a temperature graph when the liquid L is water and the principle of FIGS. 4 and 5 is applied thereto.

As illustrated in FIG. 6, a line I represents a curve of the cooling temperature of the cooling space, a line II represents a curve of the temperature of the gas Lg (air) on the surface of the water in the container C or the case Sr (or the temperature of the upper portion of the container C or the case Sr), and a line III represents a curve of the temperature of the lower portion of the container C, the case Sr or the container Cr. A temperature of an outer surface of the container C, the case Sr or the container Cr is substantially identical to the temperature of the water or liquid in the container C, the case Sr or the container Cr.

As shown, in a case where the cooling temperature is maintained at about −19° C. to −20° C. (see the line I), when the temperature of the gas Lg on the surface of the water in the container C is maintained at about 4° C. to 6° C. which is higher than a temperature of the maximum ice crystal formation zone of the water, the temperature of the water in the container C is maintained at about −11° C. which is lower than a temperature of the maximum ice crystal formation zone of the water, but the water is stably maintained in a supercooled state which is a liquid state for an extended period of time. Here, the heat generation coils H1 and H2 supply heat.

Figure 7:
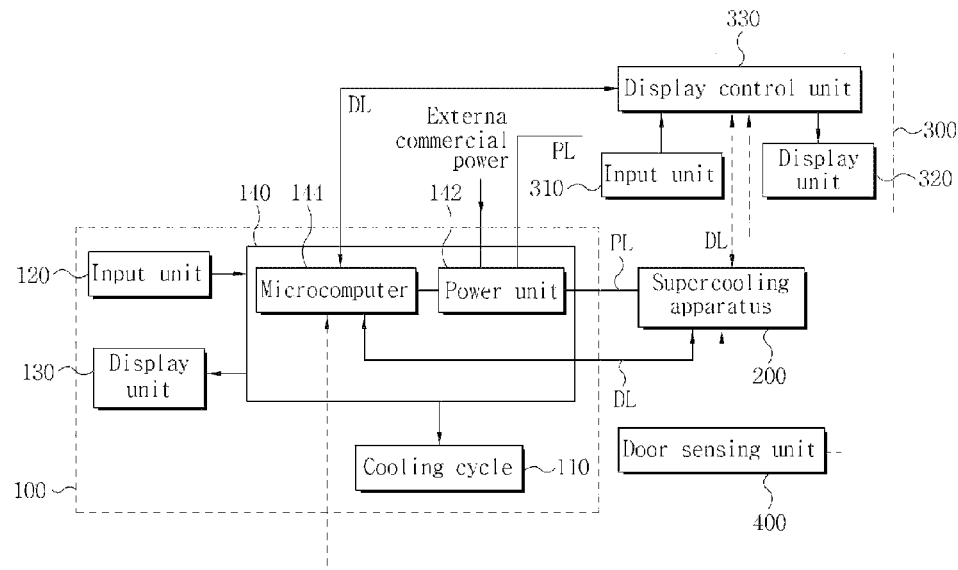
FIG. 7 is a block diagram of a supercooling system adopting a supercooling apparatus according to the present invention.
Figure 8:
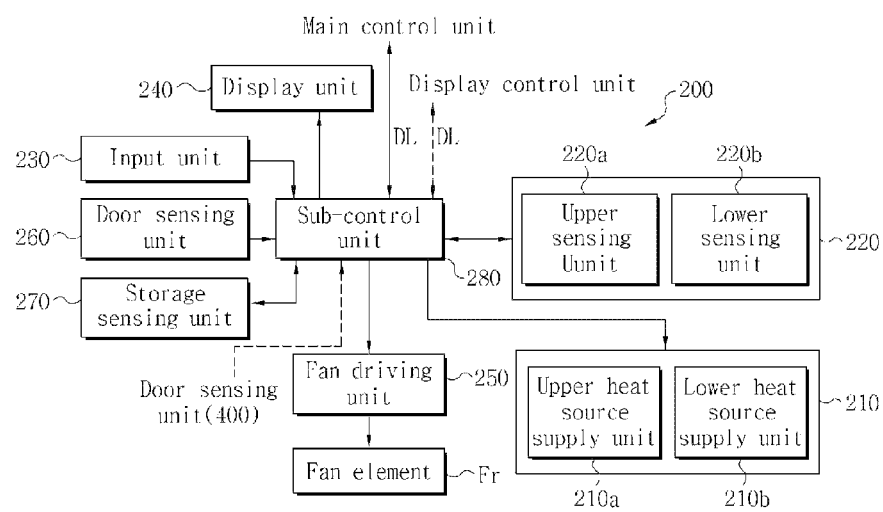
FIG. 8 is a block diagram of the supercooling apparatus of FIG. 7.

Additionally, in FIG. 6, energy is applied to the surface of the water or the gas Lg on the surface of the water before the temperature of the water reaches a temperature of the maximum ice crystal formation zone, more preferably, the phase transition temperature due to the cooling. Thus, the water stably enters and maintains the supercooled state. FIG. 7 is a block diagram of a supercooling system adopting a supercooling apparatus according to the present invention, and FIG. 8 is a block diagram of the supercooling apparatus of FIG. 7.

The supercooling system includes a cooling apparatus 100, and a supercooling apparatus 200 mounted in and cooled by the cooling apparatus 100. In addition, the supercooling system may include a display device 300 installed on a storing unit door of the cooling apparatus 100 and performing functions such as the state display and temperature setting of the cooling apparatus 100.

The cooling apparatus 100, which is provided with a storing unit storing a stored object, includes a cooling cycle (i.e., cooling means) 110 cooling the storing unit, an input unit 120 receiving the input of a setting command or the like from a user, a display unit 130 displaying a temperature state or the like of the cooling apparatus 100, and a main control unit 140 receiving external commercial power (or another power) and controlling the cooling cycle 110 to maintain the temperature in the storing unit at a temperature below at least the maximum ice crystal formation zone. Here, like a general refrigerator or freezer, the storing unit includes a storing space storing the stored object and a storing unit door opening and closing the storing space, so that the user can put the stored object into the storing unit and take the stored object out of the storing unit.

The cooling cycle 110 is divided into indirect-cooling type and direct-cooling type according to methods for cooling the stored object.

The indirect-cooling type cooling cycle includes a compressor compressing the refrigerant, an evaporator producing the cool air to cool a storing space or a stored object, a fan making the forcible flow of the produced cool air, an inlet duct introducing the cool air into the storing space, and a discharge duct inducing the cool air passing through the storing space to the evaporator. In addition, the indirect-cooling type cooling cycle may include a condenser, a dryer, an expansion device, etc.

The direct-cooling type cooling cycle includes a compressor compressing the refrigerant, and an evaporator provided in a case defining a storing space to be adjacent to the inner surface of the case and evaporating the refrigerant. Here, the direct-cooling type cooling cycle includes a condenser, an expansion valve, etc.

The input unit, which receives the input of temperature setting of the storing unit, an operation command of the supercooling apparatus 200, function setting of a dispenser, and so on from the user, may be provided as, e.g., push buttons, a keyboard or a touch pad. For example, the operation commands of the supercooling apparatus 200 may include a freezing command, a thin-ice command, a supercooling command, etc. The display unit 130 may display an operation basically performed by the cooling apparatus 100, e.g. the temperature of the storing unit, the cooling temperature, the operation state of the supercooling apparatus 200, etc. The display unit 130 may be implemented as an LCD display, an LED display, etc.

In this embodiment, the main control unit 140 includes a power unit 142 receiving commercial power (e.g., 220 V, 100 V, 230 V, etc.) and rectifying, smoothing and transforming the commercial power into operating power (e.g., 5 V, 12 V, etc.) necessary for the cooling apparatus 100 and the supercooling apparatus 200. The power unit 142 may be included in the main control unit 140 or provided as a separate element. The power unit 142 is connected to the supercooling apparatus 200 through a power line PL and supplies the necessary operating power to the supercooling apparatus 200.

The main control unit 140 includes a microcomputer 144 controlling the cooling cycle 110, the input unit 120 and the display unit 130 to enable the cooling apparatus 100 to perform the cooling operation and maintaining the inside of the storing unit at a temperature below at least the maximum ice crystal formation zone. The main control unit 140 includes a memory (not shown) storing necessary data.

The main control unit 140 (particularly, the microcomputer 144) may be connected to the supercooling apparatus 200 through a data line DL. The main control unit 140 may receive data (e.g., the current operation state of the supercooling apparatus 200) from the supercooling apparatus 200 through the data line DL, and store the data or display the data on the display unit 130. The data line DL may be selectively provided. The microcomputer 144 controls the temperature in the storing unit according to the temperature setting from the input unit 120, and maintains the inside of the storing unit at a temperature below at least the maximum ice crystal formation zone so that the supercooling apparatus 200 can independently perform the supercooling control, the cooling control, etc.

In addition, the main control unit 140 is connected to the display device 300 through a data line DL, and transmits information on the temperature of the storing unit, etc. to the display device 300, or receives the temperature setting, etc. from the display device 300. The main control unit 140 supplies power to the display device 300 through a power line PL.

The door sensing unit 400, which corresponds to a means sensing the opening and closing of the storing unit door, may include a kind of switch compressed by the closing of the storing unit door and restored by the opening thereof. The door sensing unit 400 may be connected to the main control unit 140 of the cooling apparatus 100 and transmit information on the opening and closing of the storing unit door thereto, or may be connected to the display device 300 or the supercooling apparatus 200 and transmit information on the opening and closing of the storing unit door thereto.

As illustrated in FIG. 8, the supercooling apparatus 200, which is provided with an independent storage room having a storing space therein to store a storing container containing a liquid to be supercooled, like the case of FIG. 5, and being mounted and cooled in the storing unit, includes a heat source supply unit 210 supplying heat to the storing space or generating heat in the storing space, a temperature sensing unit 220 sensing the temperature of the storing space or the stored object, an input unit 230 receiving the input of a command from the user, a display unit 240 displaying a state of the storing space or the stored object or an operation of the supercooling apparatus 200, and a sub-control unit 280 controlling the heat source supply unit 210, which is a temperature control means, based on the sensed temperature from the temperature sensing unit 220 so that the stored object in the independent storage room can be stored at least in a supercooled state.

The independent storage room includes a boundary portion provided in the storing space as in FIG. 5 to separate the upper and lower portions of the container Cr and prevent or limit the air and heat exchange therebetween.

The supercooling apparatus 200 is operated by the operating power applied from the main control unit 140. The wiring for power supply (the wiring connected to the power line PL) is connected to the entire power-needing components. This configuration has been publicly known to a person of ordinary skill in the art, and thus its description will be omitted.

The heat source supply unit 210 corresponds to a temperature control means which controls the temperature in the storing space to maintain the temperature for each of the supercooled-state control, the thin-ice control and the freezing control. The heat source supply unit 210, which is a means for applying energy to the storing space, may produce thermal energy, electric or magnetic energy, ultrasonic-wave energy, light energy, microwave energy, etc. and apply such energy to the storing space. Moreover, the heat source supply unit 210 may include thermoelectric elements mounted on the upper and lower portions of the storing space or attached to the boundary film, respectively.

Further, the heat source supply unit 210 may supply energy to thaw the stored object, when it is frozen.

The heat source supply unit 210 is composed of a plurality of sub-heat source supply units and mounted on the upper or lower portion or the side surface of the storing space to supply energy to the storing space. In this embodiment, the heat source supply unit 210 includes an upper heat source supply unit 210a (e.g., the one corresponding to the heat generation coil H1 of FIG. 5) formed in the upper space of the independent storage room which is the upper side of the storing space, and a lower heat source supply unit 210b (e.g., the one corresponding to the heat generation coil H2 of FIG. 5) formed in the lower space of the independent storage room which is the lower side of the storing space. The upper heat source supply unit 210a and the lower heat source supply unit 210b may be independently or integrally controlled by the sub-control unit 280.

Further, the temperature sensing unit 220, which senses the temperature of the storing space or the temperature of the stored object, corresponds to a sensor provided on a sidewall of the storing space to sense the temperature of the air in the storing space or provided in proximity or contact with the stored object to accurately sense the temperature of the stored object. The temperature sensing unit 220 applies a change value of a current value, a voltage value or a resistance value corresponding to the temperature to the sub-control unit 280. The temperature sensing unit 220 senses a sudden rise in the temperature of the stored object or the storing space during the phase transition of the stored object and enables the sub-control unit 280 to recognize the release of the supercooled state of the stored object.

In this embodiment, the temperature sensing unit 220 may be composed of an upper sensing unit 220a (e.g., the one corresponding to the temperature sensor C1 of FIG. 5) formed in the upper side of the independent storage room which is the upper side of the storing space, and a lower sensing unit 220b (e.g., the one corresponding to the temperature sensor C2 of FIG. 5) formed in the lower side of the independent storage room which is the lower side of the storing space. The upper sensing unit 220a and the lower sensing unit 220b are mounted on or adjacent to the surfaces having the upper heat source supply unit 210a and the lower heat source supply unit 210b thereon. The sub-control unit 280 may control the heat source supply unit 210 to perform at least the supercooling control or the cooling control according to the sensed temperature from the temperature sensing unit 220. Particularly, the sub-control unit 280 may control the upper heat source supply unit 210a according to the sensed temperature from the upper sensing unit 220a and the lower heat source supply unit 210b according to the sensed temperature from the lower sensing unit 220b, respectively.

The input unit 230, which enables the user to select an on/off switch function of the supercooling apparatus 200 and a supercooling control command, may be provided as, e.g., push buttons, a keyboard or a touch pad.

The display unit 240, which displays the on/off state of the supercooling apparatus 200 and the current control thereof (e.g., the supercooling control), may be provided as an LCD display, an LED display, etc.

As described above, the sub-control unit 280 may control the heat source supply unit 210 according to the sensed temperature from the temperature sensing unit 220, thereby independently performing the supercooling control with respect to the main control unit 140 and the cooling apparatus 100. For this independent control, the sub-control unit 280 may include a memory storing a control algorithm, etc.

In the supercooling control, the temperature of the stored object ranges from, e.g., −3° C. to −4° C. and the stored object is stored in the supercooled state. The control which senses the freezing of the stored object of the supercooled state by the phenomenon that the temperature of the stored object suddenly rises from, e.g., −4° C. is further performed during the supercooling control. Furthermore, the control which performs the thawing through the operation of the heat source supply unit 210 and resumes the cooling after the completion of the thawing is performed in the release of the supercooled state.

The sub-control unit 280 may intercept the power supply to the respective elements according to the on/off switch input of the supercooling apparatus 200 from the input unit 230, thereby preventing their operation.

The input unit 230 further has a function of acquiring a thawing command, and the sub-control unit 280 operates the heat source supply unit 210 to apply energy (particularly, heat energy) to thaw the stored object according to the thawing command from the input unit 230.

A fan driving unit 250 is an element driving a fan element Fr formed in the lower space of the storing space in the independent storage room. The driving of the fan element Fr makes the temperature distribution in the lower space of the storing space uniform. Due to the uniform temperature distribution, the stored object can rapidly enter and stably maintain the supercooled state.

When determining the supercooled state of the liquid, the sub-control unit 280 compares the upper sensed temperature Tu or the lower sensed temperature Tl (overall, T) sensed by the upper sensing unit 220a or the lower sensing unit 220b with the supercooled state temperature Tc. Preferably, the sub-control unit 280 compares the lower sensed temperature Tl almost equivalent to the temperature of the stored object with the supercooled state temperature Tc. Here, the supercooled state temperature Tc is, e.g., −4° C. If the sensed temperature is equal to or lower than the supercooled state temperature Tc, the sub-control unit 280 determines whether this temperature state has been maintained for a preset given time t1. The given time t1 corresponds to a reference time when it can be determined that the stored object enters and maintains the supercooled state from the time point when the sensed temperature T is equal to or lower than the supercooled state temperature Tc. The sub-control unit 280 determines that the stored object or the storing space has been maintained in the supercooled state. If the sensed temperature is higher than the supercooled state temperature Tc, or if the elapsed time does not reach the given time t1, the sub-control unit 280 determines the current state as the cooled state.

The sub-control unit 280 may determine the state (supercooled state or cooled state) of the liquid which is the stored object with the proceeding of the cooling of the stored object or the storing space by the process of determining the state of the stored object described above and display the state on the display unit 240. The sub-control unit 280 continuously or intermittently performs the process of determining the state of the stored object. For example, the sub-control unit 280 may control the display unit 240 to display the cooled state of the stored object with red color and the supercooled state thereof with green color. That is, the sub-control unit 280 can inform the user of the current state (supercooled state or cooled state) of the stored object.

A door sensing unit 260 is a component sensing the opening and closing of a storing space door opening and closing the storing space of the independent storage room. Like the door sensing unit 400, the door sensing unit 260 may be a switch turned on/off by the opening and closing of the storing space door. In addition to the door sensing unit 260 such as the switch, the sub-control unit 280 can determine the opening and closing of the storing space door according to the sensed temperature from the temperature sensing unit 220. For example, if the storing space door is opened, a large temperature change, such as a sudden rise in the temperature sensed by the temperature sensing unit 220, occurs due to the influence of the external temperature. In relation to this temperature change, the sub-control unit 280 can determine that the storing space door has been opened. Then, if the storing space door is closed, the sensed temperature will be slowly lowered. In relation to this temperature drop, the sub-control unit 280 can determine that the storing space door has been closed.

Moreover, the sub-control unit 280 receives the opening and closing information of the storing unit door from the door sensing unit 400, the main control unit 140, or the display device 130 (display control unit 330). When the storing unit door is opened, the noise caused by the driving of the fan element Fr in the independent storage room may be significantly transferred to the outside. Thus, the sub-control unit 280 controls the fan driving unit 250 to stop the driving of the fan element Fr. Alternatively, when the storing space door is opened, since the air circulation in the storing space is not necessary, the sub-control unit 280 controls the fan driving unit 250 to stop the driving of the fan element Fr.

Further, the sub-control unit 280 activates the display unit 240 to display the supercooled state or the cooled state of the liquid which is the stored object. Here, the sub-control unit 280 may activate the display unit 240 only when the storing unit door or the storing space door is opened, so that the user can see this state information.

A storage sensing unit 270 is a component checking whether the storing container containing the liquid to be supercooled has been located or received in the storing space. The storage sensing unit 270 may be a weight sensor provided on the bottom surface of the storing space. As the bottom surface is lifted or lowered by the weight of the storing container, the sensor can sense such lifting and lowering. Additionally, the storage sensing unit 270 may be composed of a light-emitting portion and a light-receiving portion formed on both sides of the storing space. If the light emitted by the light-emitting portion reaches the light-receiving portion, it means that the storing container has not been received. If the emitted light does not reach the light-receiving portion, it means that the storing container has been received.

The storage sensing unit 270 transfers the sensing result to the sub-control unit 280. The sub-control unit 280 can perform the supercooled-state control only when the storing container has been received in cooperation with the sensing operation of the storage sensing unit 270.

Furthermore, when the input unit 230 acquires the storage input of the stored object from the user, the sub-control unit 280 can determine the storage of the stored object. That is, when the input unit 230 acquires a storage input command of the stored object or a withdrawal input command of the stored object, the sub-control unit 280 may perform the supercooled-state control according to this command.

Next, the display device 300 includes an input unit 310 and a display unit 320 formed on the outside of the storing unit door of the cooling apparatus 100 and performs the state display and temperature setting of the cooling apparatus 100 from the user. The display device 300 includes the display control unit 330 controlling the input unit 310 and the display unit 320 and communicating with the main control unit 140 through a data line DL. Here, the display device 300 is operated by power applied from the main control unit 140. The wiring for power supply in the display device 300 is a technical construction obvious to a person of ordinary skill in the art, and thus its description will be omitted.

The display control unit 330 may communicate with the door sensing unit 400, check the information on the opening and closing of the storing unit door, and transmit this information to the main control unit 140 and/or the supercooling apparatus 200.

In addition, the display control unit 330 may communicate with the supercooling apparatus 200, receive the information on the supercooled state of the current stored object, and display this information on the display unit 320.

Figure 9:
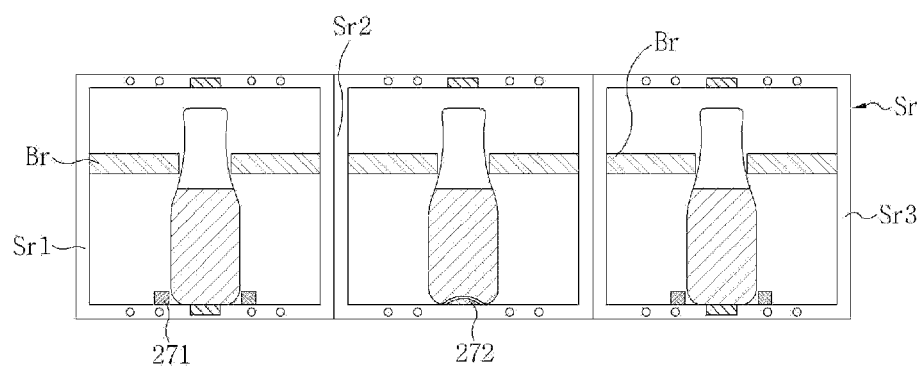
FIG. 9 is a schematic configuration view of another supercooling apparatus.

FIG. 9 is a schematic configuration view of another supercooling apparatus.

As illustrated in FIG. 9, the supercooling apparatus Sr (or independent storage room) includes three separated independent storage rooms Sr1 to Sr3. A boundary film Br is provided in a storing space defined in each independent storage room Sr1 to Sr3. Heat generation coils and temperature sensors C1 and C2 are provided in upper and lower portions of each independent storage room Sr1 to Sr3.

A guide portion 271 guiding a container to be located on the temperature sensor C2 is provided on the bottom surface of the independent storage room Sr1. When a user puts the container into the storing space, the guide portion 271 informs the user of the container's position or guides the container to ensure accurate temperature sensing. The guide portion 271 may be provided as a plurality of protrusions or a tubular protrusion enclosing the bottom surface on the temperature sensor C2.

Additionally, a guide portion 272 corresponding to the bottom surface of the container or informing the user of the container's position is provided on the bottom surface of the independent storage room Sr2. The guide portion 272 may be formed in the shape of a circular protrusion and brought into contact with the bottom surface of the container. Moreover, a plurality of sub-control units 280 may be provided corresponding to the independent storage rooms Sr1 to Sr3, respectively, and one sub-control unit 280 may control the whole independent storage rooms Sr1 to Sr3.

Figure 10:
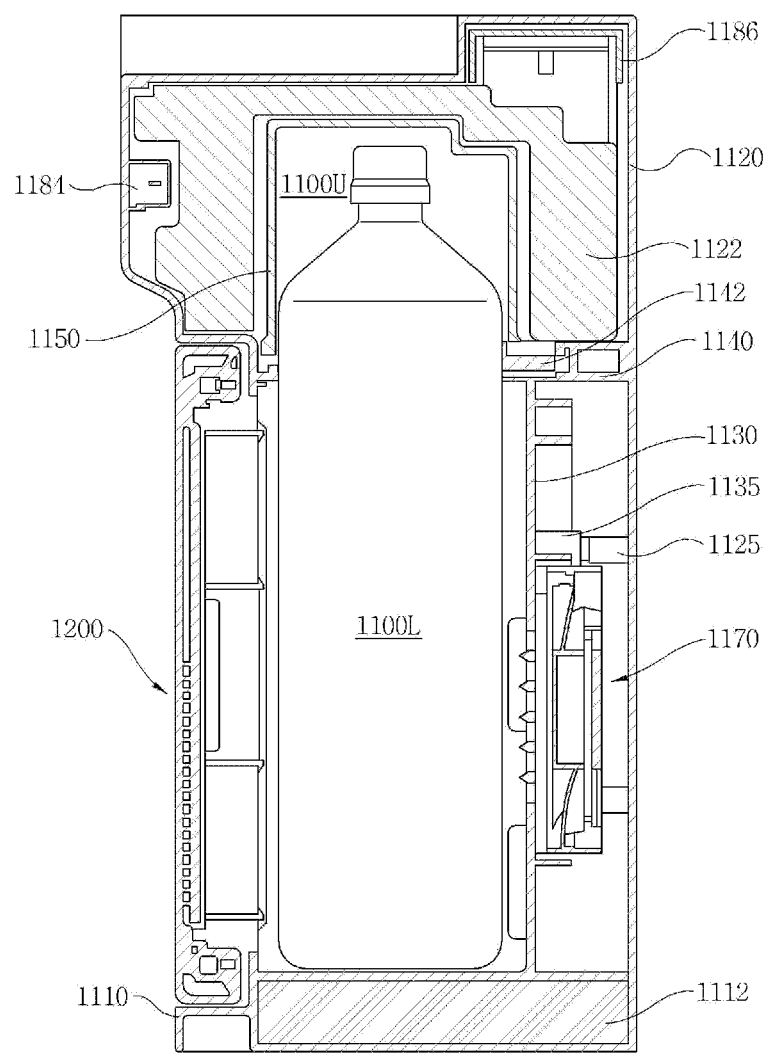
FIG. 10 is a detailed sectional view of the supercooling apparatus of FIG. 5.
Figure 11:
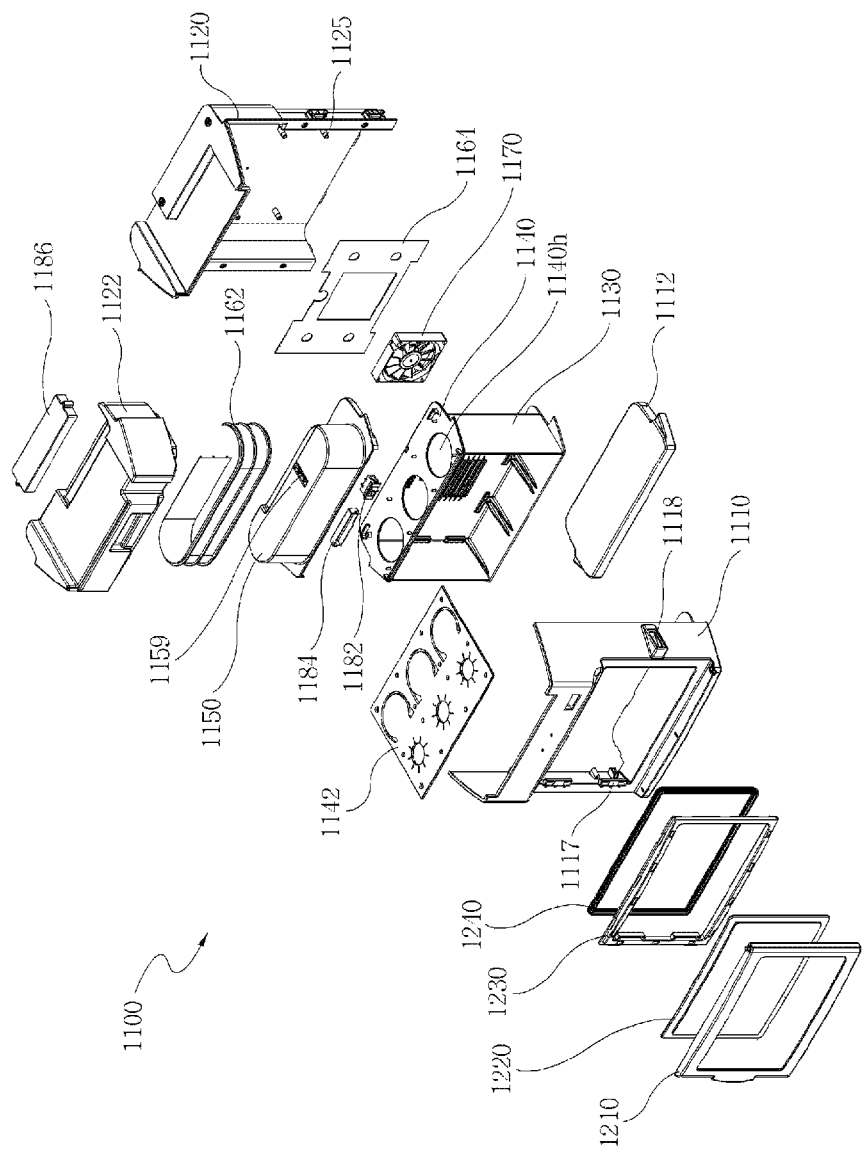
FIG. 11 is an exploded perspective view of the supercooling apparatus of FIG. 5.

FIG. 10 is a detailed sectional view of the supercooling apparatus of FIG. 5, and FIG. 11 is an exploded perspective view of the supercooling apparatus of FIG. 5. The supercooling apparatus (or independent storage room) according to the present invention includes a casing 1100 defining an inner space storing a container and a door 1200 opening and closing the casing 1100, and is installed in a cooling apparatus storing food at a temperature below 0° C. such as a freezing chamber of a refrigerator.

The casing 1100, which separates the outer space, i.e., the space in the cooling apparatus where the supercooling apparatus is installed from the inner space in the supercooling apparatus, includes outer casings 1110 and 1120 forming the external appearance of the supercooling apparatus. The outer casings 1110 and 1120 include a front outer casing 1110 and a rear outer casing 1120.

The front outer casing 1110 forms the external appearance of the front and lower portions of the supercooling apparatus, and the rear outer casing 1120 forms the external appearance of the rear and upper portions of the supercooling apparatus. The casing 1100 enables upper and lower portions of the container containing a liquid to be located and stored in different temperature regions. More specifically, the lower portion of the container is located in a temperature region (about −1° C. to −7° C.) of the maximum ice crystal formation zone, and the upper portion of the container is located in a higher temperature region (about −1° C. to 2° C.) in which the ice crystals are not easy to form. For this purpose, the casing 1100 includes a lower space 1100L having the temperature region (about −1° C. to −7° C.) of the maximum ice crystal formation zone, and an upper space 1100U having the temperature region (about −1° C. to 2° C.) in which the ice crystals are not easy to form. The upper space 11000 and the lower space 1100L are separated by a bulkhead 1140. The casing 1100 includes an inner casing 1130 defining the lower space 1100L with the bulkhead 1140 and a cap casing 1150 defining the upper space 11000 with the bulkhead 1140.

A cooling fan 1170 is installed at the rear of the lower space 1100L so that the liquid stored in the lower portion of the container located in the lower space 1100L can rapidly reach the temperature region (about −1° C. to −7° C.) of the maximum ice crystal formation zone and have a supercooled state. In addition, a lower heater 1164 is provided to adjust the temperature of the lower space 1100L. An upper heater 1162 is installed around the cap casing 1150 so that the upper portion of the container located in the upper space 11000 can be maintained in the temperature region (about −1° C. to 2° C.) in which the ice crystals are not easy to form. Moreover, a separation film 1142 made of an elastic material is installed on the bulkhead 1140 to prevent the heat exchange from occurring between the upper space 11000 and the lower space 1100L having different temperatures due to a forcible flow produced by the cooling fan 1170.

Meanwhile, a thermal insulator 1112 for insulating the lower space 1100L from the outer space is provided in the lower portions of the outer casings 1110 and 1120, and a thermal insulator 1122 for insulating the upper space 11000 from the outer space is provided in the upper portions of the outer casings 1110 and 1120. In addition, a power switch 1182, a display unit 1184 and the like are installed between the front outer casing 1110 and the thermal insulator 1122, and a control unit (not shown) and a control unit installation portion 1186 are installed between the rear outer casing 1120 and the thermal insulator 1122.

The door 1200 is installed on the front surface of the front outer casing 1110 to open and close the lower space 1100L. The door 1200 includes a door window 1220 made of a transparent or semitransparent material in a door casing 1210, a door frame 1230 fixed to the door casing 1210 and fixing the door window 1220 therewith, and a gasket 1240 mounted at the rear of the door frame 1230 and sealing between the door 1200 and the front outer casing 1110.

The supercooling apparatus of the present invention may be provided in the refrigerator, particularly, in the freezing chamber of the refrigerator and installed in the freezing chamber door. As the supercooling apparatus of the present invention has a shallow depth and a relatively large height and width compared to the depth, it may be installed in the freezing chamber door to occupy a minimum area in the storing space of the freezing chamber.

Figure 12:
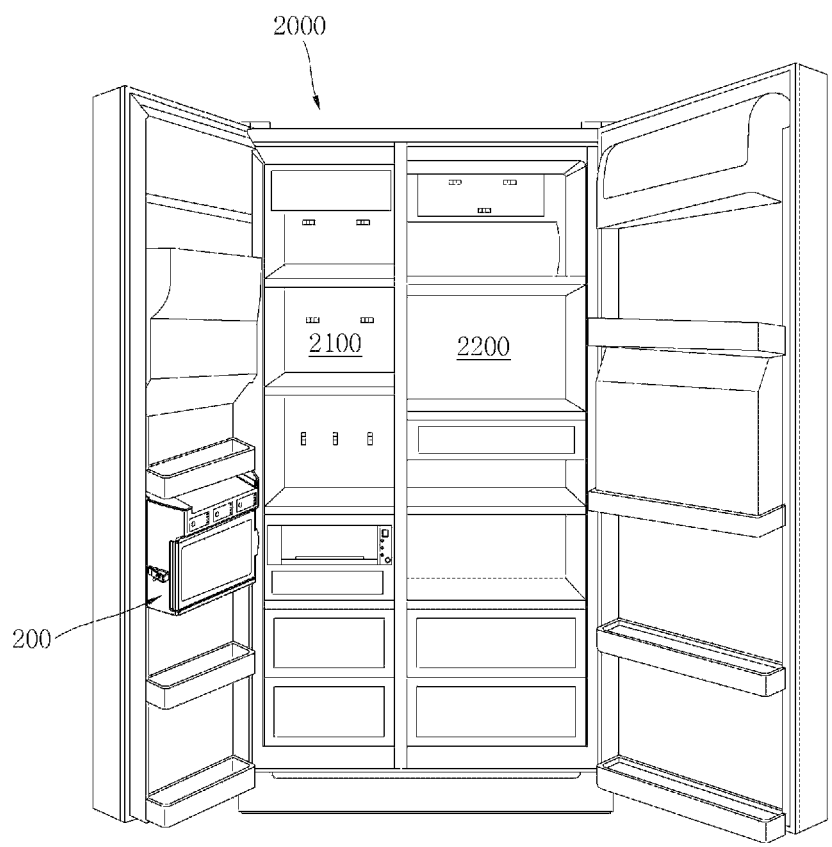
FIG. 12 is a perspective view of a refrigerator including a supercooling apparatus.

FIG. 12 is a view of a refrigerator including a supercooling apparatus according to the present invention. The refrigerator 2000 is partitioned into a freezing chamber 2100 and a refrigerating chamber 2200 provided with a door, respectively. The supercooling apparatus 200 is provided in such a manner that a casing 1100 is fixed to the freezing chamber door. The cool air in the freezing chamber 2100 is introduced into the supercooling apparatus 200 installed in the door to cool a container and a liquid contained in the container.

In a state where the freezing chamber door is opened, if a cooling fan 1170 and heaters 1162 and 1164 are operated, the air of room temperature may be circulated in the supercooling apparatus at a high speed and suddenly raise the temperature of the liquid maintained in the supercooled state. A sensor 1118 capable of sensing the opening of the freezing chamber door may be installed around a rotating shaft of the freezing chamber door or in the opposite side. The embodiment of FIG. 11 shows a case in which the sensor 1118 is installed around the rotating shaft, and the embodiment FIG. 12 shows a case in which the sensor 1118 is installed in the opposite side to the rotating shaft in the door. If the sensor 1118 is installed in the opposite side to the rotating shaft in the door, a user can easily press the sensor 1118 to operate the cooling fan 1170 and the heaters 1162 and 1164 in the same way as when the door is closed, so that the air of room temperature can be circulated in the supercooling apparatus by the convection. The position of the sensor 1118 and the opening direction of the door 1200 may be optionally changed. Meanwhile, the supercooling apparatus may be provided to be detachable from the freezing chamber door. That is, when a coupling device composed of concave and convex parts is provided to the outer casing 1100 and the freezing chamber door to fix the supercooling apparatus, if the supercooling apparatus is necessary, it can be attached to the inside of the freezing chamber door. On the contrary, if the supercooling apparatus is not necessary, it can be detached from the freezing chamber door, so that the space in the freezing chamber door can be effectively used. In the meantime, when the supercooling apparatus is provided in detachable type, a terminal capable of transferring power should be provided between the freezing chamber door and the outer casing 1110.

According to another embodiment of the refrigerator including the supercooling apparatus, although a supercooling apparatus is installed in a freezing chamber door, a user can take out a liquid stored in a supercooled state without opening the freezing chamber door. An opening portion is formed in the freezing chamber door, and a door 1200 of the supercooling apparatus is formed in a position corresponding to the opening portion. Therefore, the door 1200 of the supercooling apparatus can be opened through the opening portion. In this situation, it is preferable to form a thermal insulator in the door 1200 of the supercooling apparatus to prevent the heat exchange with the outer space through the door 1200 of the supercooling apparatus. Alternatively, like freezing chamber door, a door provided with a thermal insulator is formed on the opening portion of the freezing chamber door. Here, to take a container containing a supercooled liquid out of the supercooling apparatus or put the container into the supercooling apparatus, the user should open the door for opening and closing the opening portion, and then open the door 1200 of the supercooling apparatus. If the door 1200 of the supercooling apparatus and the door for opening and closing the opening portion formed in the freezing chamber door are separately formed, the thermal insulation effect is improved but the convenience in use is reduced. On the contrary, if the door 1200 of the supercooling apparatus includes the thermal insulator and opens and closes the opening portion of the freezing chamber door, the thermal insulation effect is a little degraded. However, the user only needs to open one door to use the supercooling apparatus. If the door 1200 of the supercooling apparatus and the door for opening and closing the opening portion of the freezing chamber door are separately formed, it is preferable that a switch mounting portion having a switch installed thereon to turn on/off power of the supercooling apparatus and a display unit displaying the state of the liquid stored in the supercooling apparatus should be provided on the freezing chamber door or the door for opening and closing the opening portion of the freezing chamber door.

The present invention has been described in detail in connection with the exemplary embodiments and the accompanying drawings. However, the scope of the present invention is not limited thereto but is defined by the appended claims.

The invention claimed is:

1. A supercooling system, comprising:
    a cooling apparatus including a storing unit storing a stored object, a cooling means cooling the storing unit, and a main control unit receiving external commercial power and controlling the cooling means to maintain the temperature in the storing unit at a temperature below the maximum ice crystal formation zone of a liquid; and
    a supercooling apparatus including an independent storage room having a storing space therein to receive a storing container containing a liquid to be supercooled, and being mounted and cooled in the storing unit, a temperature sensing unit sensing the temperature of the independent storage room, a temperature control means mounted in the independent storage room and controlling the internal temperature such that a temperature of an upper portion of the storing space or the storing container is higher than a temperature of a lower portion of the storing space or the storing container, and a sub-control unit controlling the temperature control means based on the sensed temperature from the temperature sensing unit to store the liquid in a supercooled state.

2. The supercooling system of claim 1, wherein a boundary film is provided to limit the air and heat exchange between the upper and lower portions of the storing space, and at least a part of the storing container passes through the boundary film, so that the storing container is located in the upper and lower portions of the storing space.

3. The supercooling system of claim 2, wherein the supercooling apparatus comprises a fan element circulating the air in the lower portion of the storing space by forcible convection.

4. The supercooling system of claim 1, wherein the supercooling apparatus is operated by the operating power applied from the main control unit, and the sub-control unit independently performs the supercooled-state control on the liquid with respect to the main control unit.

5. The supercooling system of claim 4, wherein the supercooling apparatus comprises an input unit capable of acquiring a supercooling control input and a cooling control input in relation to the stored object and a display unit capable of displaying the state of the current control, and the sub-control unit controls the input unit and the display unit.

6. The supercooling system of claim 1, wherein the temperature control means comprises a heat source supply unit supplying or generating heat in the independent storage room.

7. The supercooling system of claim 6, wherein the heat source supply unit comprises an upper heat source supply unit installed in the upper portion of the storing space and a lower heat source supply unit installed in the lower portion of the storing space.

8. The supercooling system of claim 7, wherein the temperature sensing unit is installed in at least one of the upper and lower portions of the storing space.

9. The supercooling system of claim 8, wherein the sub-control unit independently controls the upper and lower heat source supply units based on temperatures sensed by temperature sensing units installed in the upper portion and the lower portion of the storing space that correspond to the upper and lower heat source supply units.

10. The supercooling system claim 1, wherein the supercooling apparatus comprises a plurality of independent storage rooms separated from one another, and either the sub-control unit independently controls each independent storage room, or a plurality of independent sub-control units are provided in the independent storage rooms.

11. The supercooling system of claim 6, wherein the heat source supply unit comprises thermoelectric elements mounted in the upper and lower portions of the storing space.

12. The supercooling system of claim 1, wherein the cooling apparatus comprises a storing unit door opening and closing the storing unit, and the supercooling system comprises a first sensing unit sensing the opening and closing of the storing unit door.

13. The supercooling system of claim 12, wherein the cooling apparatus comprises a display device displaying the operation state and temperature information of the supercooling system, and either the first sensing unit is connected to the display device or the main control unit and the sub-control unit acquires the opening and closing information of the storing unit door from the display device or the main control unit, or the first sensing unit is connected directly to the sub-control unit.

14. The supercooling system of claim 13, wherein the sub-control unit stops the driving of the fan element and activates the display unit when the storing unit door is opened.

15. The supercooling system of claim 12, wherein the supercooling apparatus comprises a storing space door opening and closing the storing space and a second sensing unit sensing the opening and closing of the storing space door.

16. The supercooling system of claim 15, wherein the second sensing unit senses a temperature change in the storing space and determines the opening and closing of the storing space door.

17. The supercooling system of claim 15, wherein the sub-control unit is connected to the second sensing unit and stops the driving of the fan element and activates the display unit when the storing space door is opened.

18. The supercooling system of claim 1, wherein the temperature sensing unit is located corresponding to the bottom surface of the storing container.

19. The supercooling system of claim 18, wherein the supercooling apparatus comprises a position guide portion guiding the center of the bottom surface of the storing container to be located on the temperature sensing unit.

20. The supercooling system of claim 1, wherein the supercooling apparatus comprises a storage sensing unit determining whether the storing container has been located in the storing space, and the sub-control unit performs the supercooled-state control in cooperation with the sensing result of the storage sensing unit.

21. The supercooling system of claim 20, wherein the storage sensing unit is operated by the weight of the storing container.

22. The supercooling system of claim 20, wherein the storage sensing unit comprises a light-emitting portion formed in the storing space and a light-receiving portion corresponding to the light-emitting portion, and senses the storage of the storing container by the operation of the light-emitting portion and the light-receiving portion.

* * * * *